(12) United States Patent
Stringham

(10) Patent No.: US 7,464,234 B1
(45) Date of Patent: Dec. 9, 2008

(54) POSITION INDEPENDENT INCREMENTAL BACKUP

(75) Inventor: Russell R. Stringham, Orem, UT (US)

(73) Assignee: Symantec Corporation, Cupertino, CA (US)

( * ) Notice: Subject to any disclaimer, the term of this patent is extended or adjusted under 35 U.S.C. 154(b) by 592 days.

(21) Appl. No.: 11/087,143

(22) Filed: Mar. 23, 2005

(51) Int. Cl.
*G06F 12/00* (2006.01)

(52) U.S. Cl. ........................ 711/162; 711/161

(58) Field of Classification Search .............. None
See application file for complete search history.

(56) References Cited

U.S. PATENT DOCUMENTS

2003/0101321 A1* 5/2003 Ohran .................. 711/162

* cited by examiner

*Primary Examiner*—Reginald G. Bragdon
*Assistant Examiner*—Ngoc V Dinh
(74) *Attorney, Agent, or Firm*—Advantedge Law Group

(57) ABSTRACT

Mechanisms for backing up at least a portion of storage at a primary computing system to a backup computing system. The primary system identifies primary memory block(s) that have altered content since the time of a last backup. For each such primary block, the primary system estimates whether or not the altered content of the primary block is the same as content of another primary block as the content existed at the time of a specific backup. If they are the same, the primary system backs up the corresponding block by simply informing the backup system of the matching content, and having the backup system write the matching content of other backup block over the respective backup block, rather than transferring the entire block contents.

18 Claims, 6 Drawing Sheets

POSITION INDEPENDENT INCREMENTAL BACKUP

BACKGROUND OF THE INVENTION

1. The Field of the Invention

The present invention relates to computing technology; and more specifically, to mechanisms for efficiently backing up data from a primary computing system to a backup computing system.

2. Background and Related Art

Computing technology has transformed the way we work and play. Businesses, residences, and other enterprises have come to rely on computing systems to manage their key operational data. Often, the data itself is many times more valuable to an enterprise than the computing hardware that stores the data. Accordingly, in this information age, many enterprises have taken precautions to protect their data.

One way of protecting data is to introduce storage redundancy. For example, a primary computing system maintains and operates upon the active data. Meanwhile, a backup computing system maintains a copy of the data as the active data existed at a previous instant in time. The backup copy of the data is periodically updated. More frequent updates tend to increase the freshness of the data at the backup computing system.

In order to provide such a backup copy to the backup computing system, resources associated with the channel between the primary and backup computing systems are used. For example, when the primary and backup computing systems are located across a network, network bandwidth and other resources are consumed. Even if the primary and backup computing systems are located on the same machine, disk access time and processing resources are expended.

In order to reduce the channel resources expended in order to transfer the backup copy, incremental backup technology is employed. Initially, a full backup is performed such that the backed up memory blocks on the backup computing system have the same content as the corresponding primary memory blocks on the primary computing system. Moving forward from the time of the last backup, the primary computing system may continue to operate on the primary data. As this happens, the content of certain memory blocks (e.g., disk sectors or clusters) on the primary computing system may change due to writes to these memory blocks. During a subsequent incremental backup operation, only the content for the associated primary memory blocks that have changed since the time of the last backup operation are transferred to the backup computing system.

The use of incremental backup technology can significantly reduce the channel resources used to perform the backup. However, valuable channel resources are still expended. What would be advantageous are mechanisms for performing backup operations in a manner that uses further reduced channel resources.

BRIEF SUMMARY OF THE INVENTION

The foregoing problems with the prior state of the art are overcome by the principles of the present invention, which are directed towards mechanisms for backing up at least a portion of storage at the primary computing system to a backup computing system. Memory blocks of the primary computing system and backup computing system are referred to herein as "primary memory blocks" and "backup memory blocks", respectively.

To implement the backup, the primary computing system identifies primary memory block(s) that have altered content, i.e. content that has changed since the time of a last backup to the backup computing system. For each such primary memory block, the primary computing system estimates whether or not the altered content of the primary memory block is the same as content of another primary memory block, as that content existed at the time of a specific backup. If they are the same, the primary computing system backs up the corresponding memory block by simply informing the backup computing system of the existence of the matching content, rather than transferring the entire content of the memory block. The backup computing system may then write the matching content over the corresponding backup block to complete the backup for that memory block, without requiring the transfer of the entire content of the memory block from the primary computing system to the backup computing system in order to complete the backup of the memory block.

The size of the data needed to communicate identification of the matching content is much smaller than the size of the new content of the memory block. Accordingly, channel resources are further preserved when the memory block to be backed up has matching content in another, previously backed up memory block.

Additional embodiments the invention will be set forth in the description that follows, and in part will be obvious from the description, or may be learned by the practice of the invention. The embodiments of the invention may be realized and obtained by means of the instruments and combinations particularly pointed out in the appended claims. These and other embodiments of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to mechanisms for backing up at least a portion of storage at a primary computing system to a backup computing system. The primary system identifies primary memory block(s) that have altered content since the time of a last backup. For each such primary block, the primary system estimates whether or not the altered content of the primary block is the same as content of another primary block as the content existed at the time of a specific backup. If they are the same, the primary system backs up the corresponding block by simply informing the backup system of the identity of the matching content, rather than transferring the entire block contents.

First, a general computing system will be described with respect to FIG. 1, as being a suitable computing system that may be used to practice the principles of the present invention. Then, the primary and backup environment in which the invention may be practiced will be described with respect to FIG. 2. Finally, the specific embodiments of the present invention will be described with respect to FIGS. 3, 4A, 4B, 5, 6 and 7.

Figure 1:
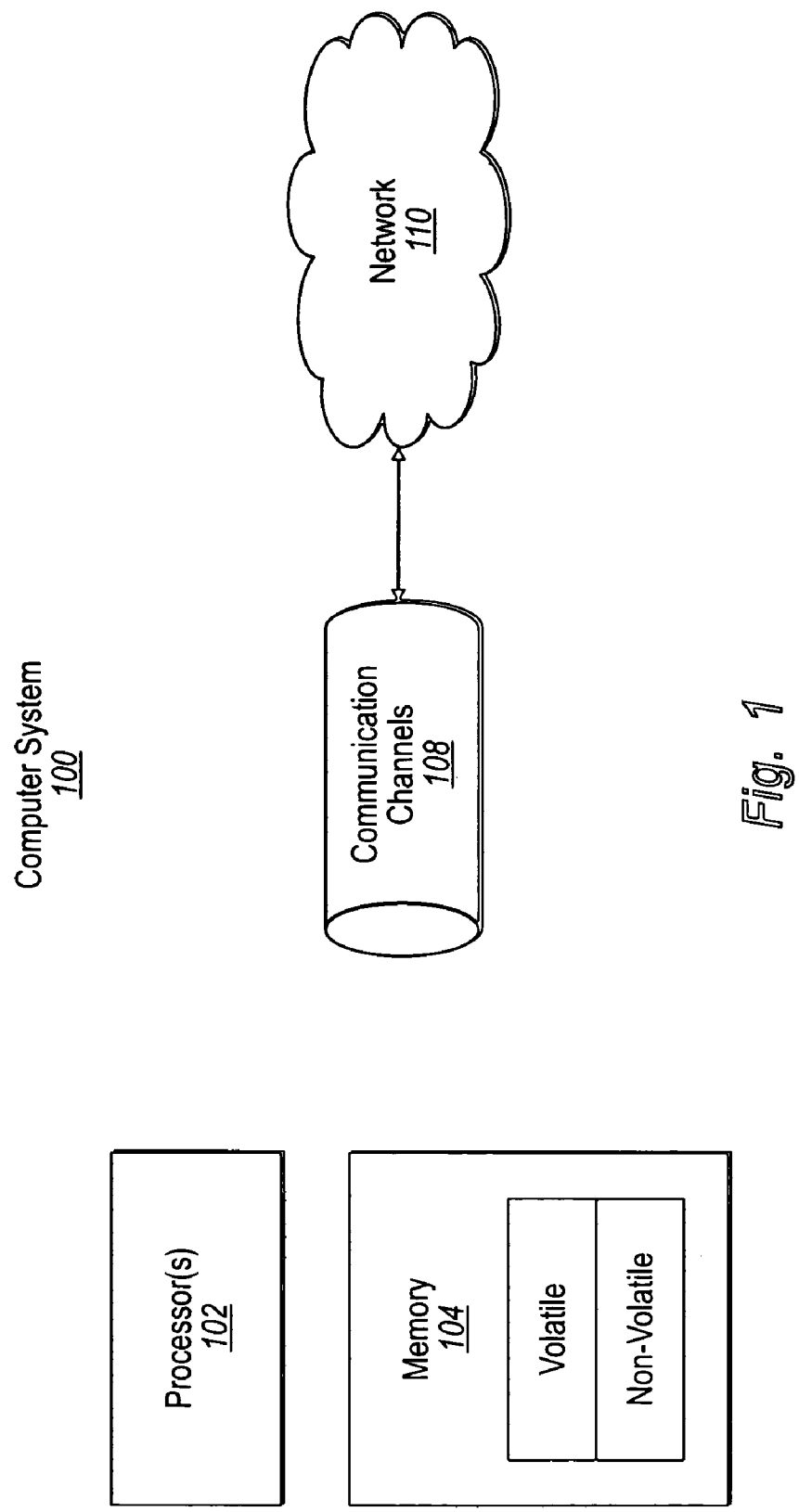
FIG. 1 illustrates a computing environment in which the principles of the present invention may be employed.

FIG. 1 shows a schematic diagram of an example computing system that may be used to implement features of the present invention. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Computing systems are now increasingly taking a wide-variety of forms. Computing systems may, for example, be handheld devices, appliances, laptop computers, desktop computers, mainframes, or distributed computing systems. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Referring to FIG. 1, in its most basic configuration, a computing system 100 typically includes at least one processing unit 102 and memory 104. The memory 104 may be volatile, non-volatile, or some combination of the two. Examples of volatile memory include Random Access Memory (RAM). Examples of non-volatile memory include Read Only Memory (ROM), flash memory, or the like. The term "memory" may also be used herein to refer to non-volatile mass storage. Such storage may be removable or non-removable, and may include (but not limited to) PCM-CIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Figure 2:
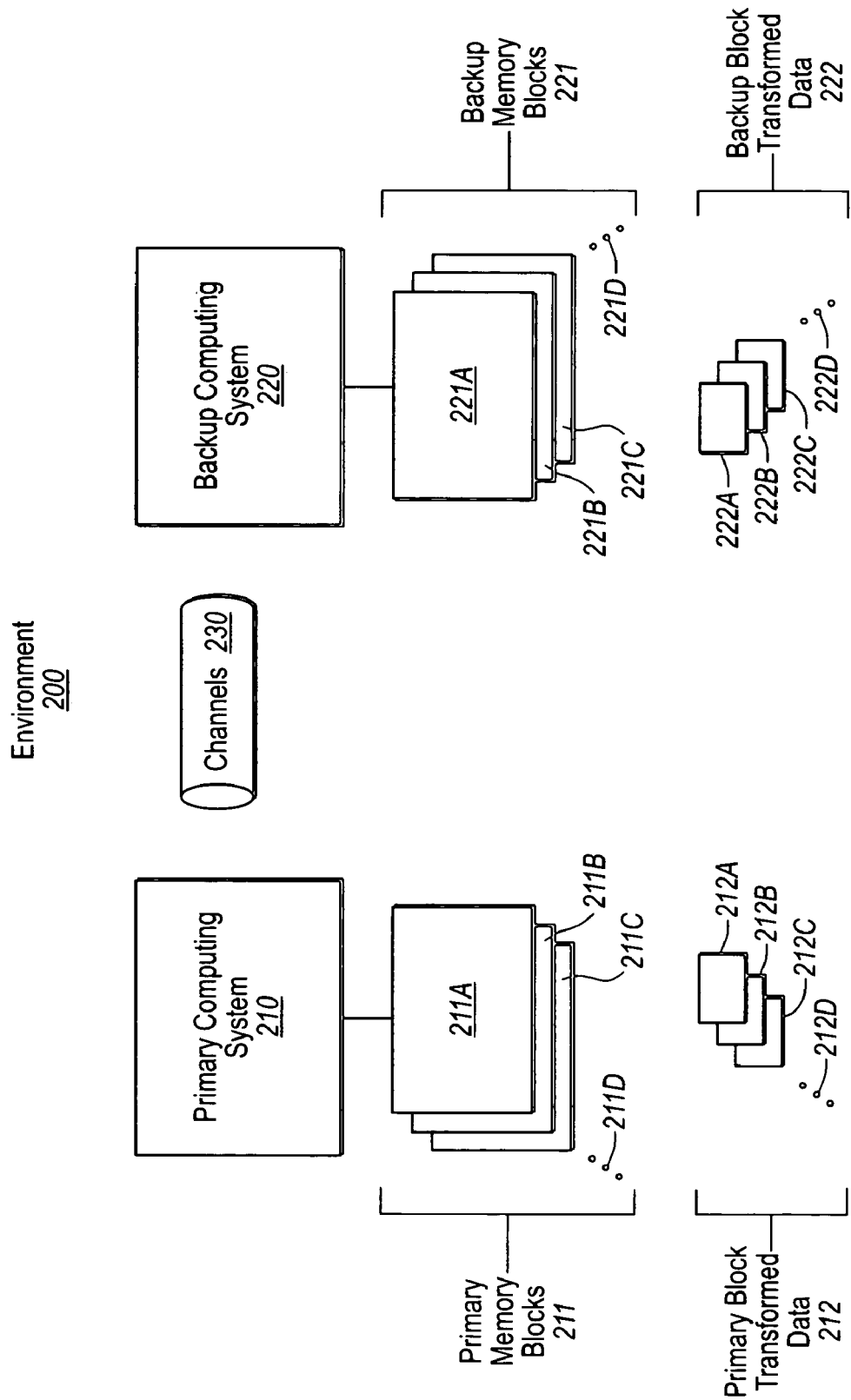
FIG. 2 illustrates a network environment in which a backup computing system maintains a backup version of active data of the primary computing system, as that active data existed at a previous instant in time.

FIG. 2 illustrates a network environment 200 that includes a primary computing system 210 and a backup computing system 220. The primary computing system 210 is termed "primary" because it maintains the active data that is to be protected. The backup computing system 220 is termed "backup" because it maintains a backup copy of the active data as the active data existed at a previous point in time. The primary computing system 210 and the backup computing system 220 may each be structured as described above for the computing system 100 of FIG. 1. However, this is not required by any means. The primary computing system 210 and the backup computing system 220 may be any computing system of any form.

The primary computing system 210 and the backup computing system 220 each have access to multiple memory blocks. As used herein the term, "memory block" refers to any portion of memory, whether volatile memory, or non-volatile memory or storage. For instance, in the case of magnetic or optical disk storage, memory blocks may be measured in terms of "sectors". A sector is an addressable portion of disk space that is often 512 bytes in size for magnetic disk drives. When referring to magnetic disk drives, a "cluster" is almost always an integer multiple of the sector size, such as 1024 bytes or 4096 bytes as directed by the operating system.

When working with disk storage, it is often convenient to work with entire sectors or clusters of storage at a time. However, even when operating on disk storage, the principles of the present invention may also operate with primary or backup "memory blocks" that are not sized as integer multiples of sectors and/or clusters. Furthermore, although there are efficiencies in working with multiple memory blocks of the same size, the principles of the present invention are not limited to working with memory blocks that are of the same size. The memory blocks may be, for example, files, which often have variable sizes as permitted by the file system. The memory block may even include several discontiguous portions of physical memory space, such that data that is not part of the memory block is interspersed between data that is part of the memory block.

The primary memory blocks 211A, 211B, 211C, and 211D may be referred to herein collectively as "primary memory blocks 211". The ellipses 211D represent that there may be any number of primary memory blocks managed by the primary computing system 210. The backup computing system 220 is illustrated as having access to a number of memory blocks 221A, 221B, 221C amongst potentially many others as represented by the ellipses 221D. Such backup memory blocks may be referred to collectively herein as "backup memory blocks 221".

As the primary computing system 210 normally operates, the "data" within any given primary memory block may change over time. At certain times referred to herein as "backup times", the primary computing system 210 provides an image or "picture" of at least some of the primary memory blocks as those blocks existed at the corresponding backup time, and then provides the memory blocks to the backup computing system 220. The primary computing system 210 may communicate with the backup computing system 220 over channel 230. The channel 230 may be, for example, a network, but may also be a bus internal to a single computing system.

Figure 3:
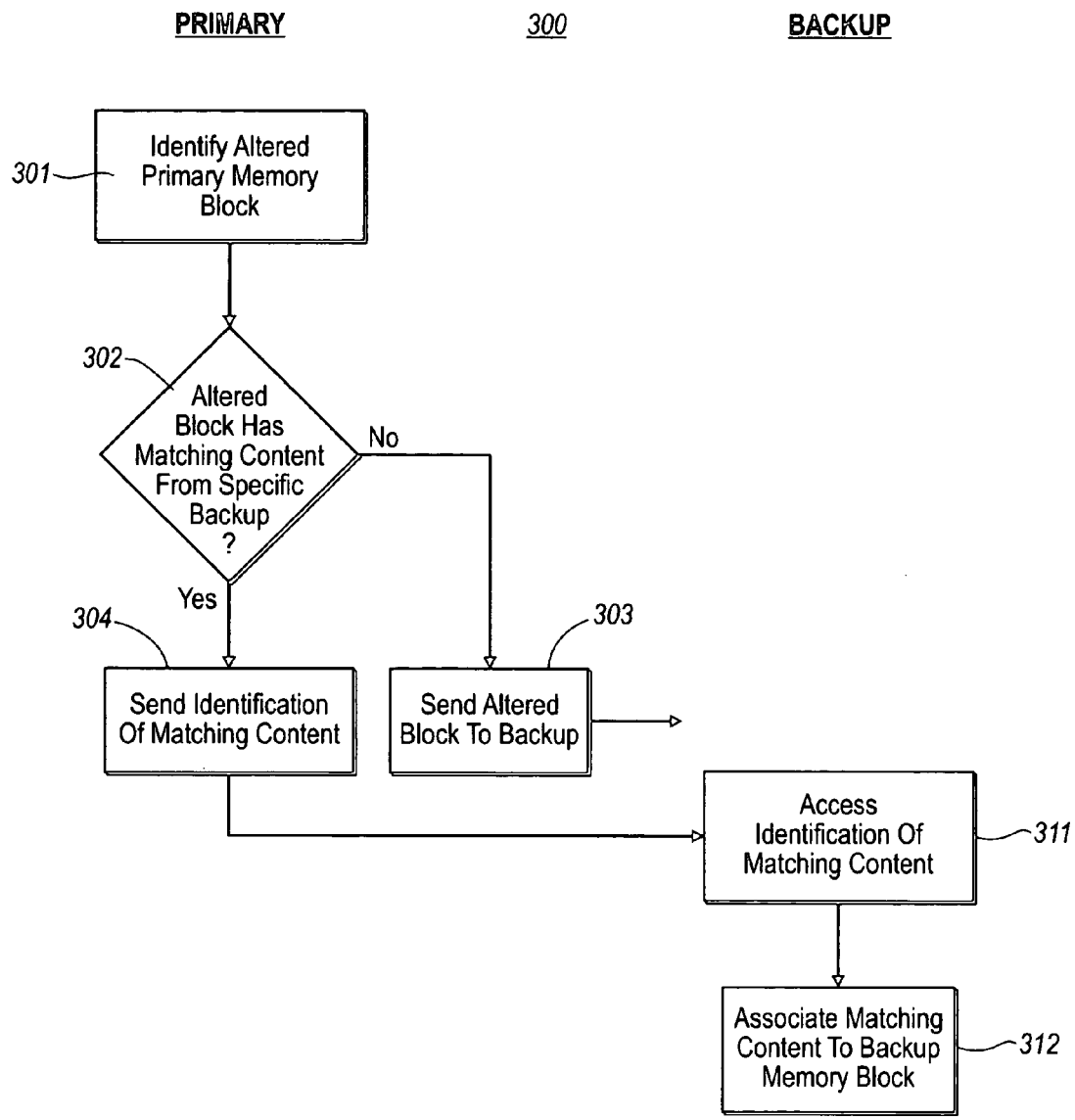
FIG. 3 illustrates a flowchart of a method for backing up memory blocks in accordance with the principles of the present invention.

FIG. 3 illustrates a flowchart of a method 300 for backing up at least a portion of storage from a primary computing system to a backup computing system in accordance with the principles of the present invention. The primary computing system may be, for example, the primary computing system 210 described above with respect to FIG. 2. The backup computing system may be, for example, the backup computing system 220 described above with respect to FIG. 2. Some of the acts of the method 300 are performed by the primary computing system 210 as represented in the left column of FIG. 3 under the heading "PRIMARY". Others of the acts of the method 300 are performed by the backup computing system 220 as represented in the right column of FIG. 3 under the heading "BACKUP". The method 300 may be performed for each primary memory block that may potentially be backed up.

Figure 7:
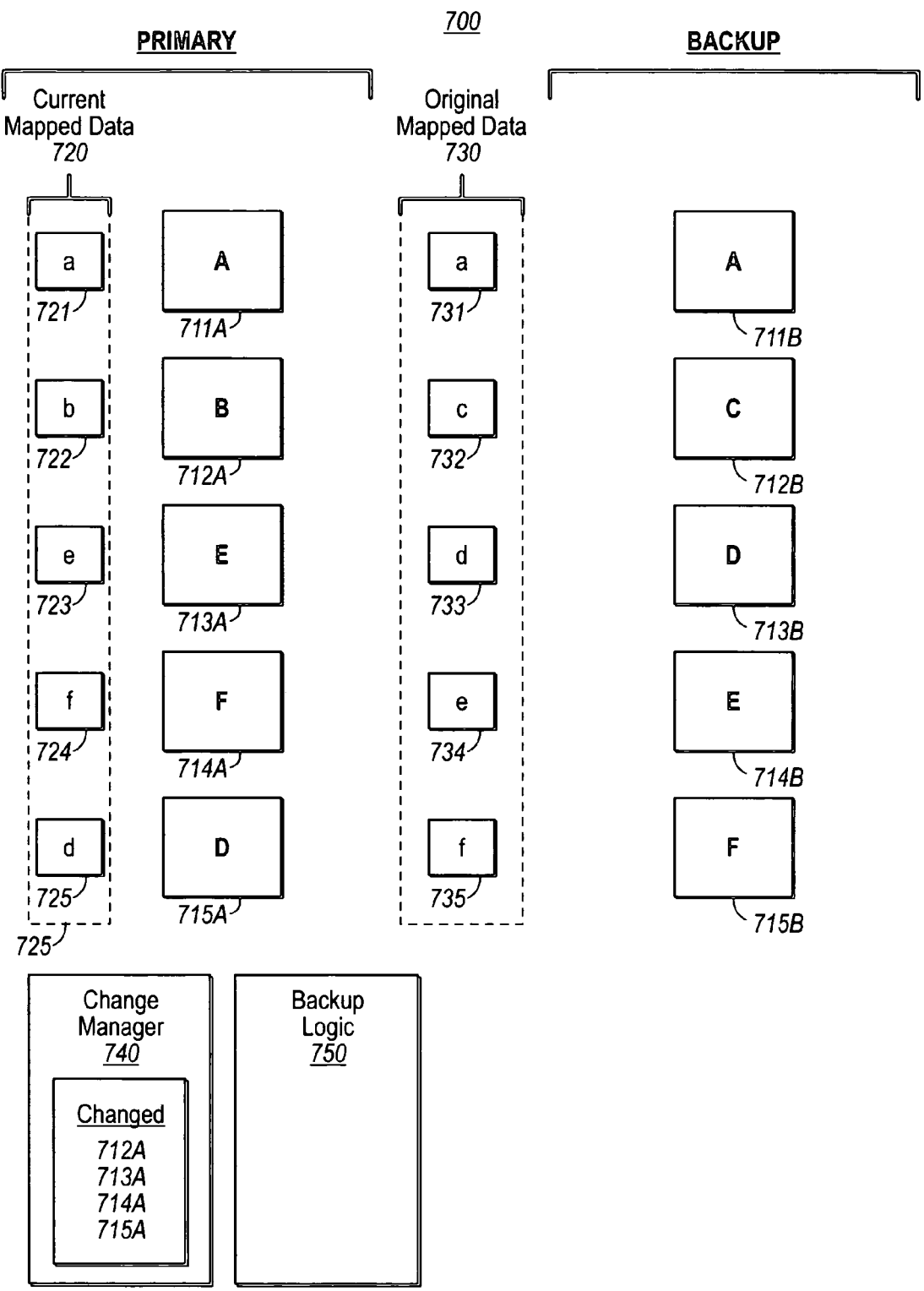
FIG. 7 schematically illustrates example primary and backup data blocks with associated mapped data used for further clarifying the principles of the present invention.

The method 300 includes identifying a primary memory block having altered content that has changed since the time of a last backup to the backup computing system. FIG. 7 illustrates an example environment 700 that will frequently be referred to when describing the method 300. The example environment 700 shows that the primary computing system manages primary memory blocks 711A, 712A, 713A, 714A and 715A. The backup computing system stores memory blocks 711B, 712B, 713B, 714B, and 715B, which each represent the backed up content corresponding to primary memory blocks 711A, 712A, 713A, 714A and 715A, respectively.

Alphabetic letters represent the content of the memory block. For instance, backup memory block 711B includes the letter "A", whereas the corresponding primary memory block 711A also includes the letter "A". This represents that the content of the corresponding primary memory block 711A has not changed since the time of the last backup. In contrast, backup memory block 712B contains the letter "C", whereas the corresponding primary memory block 712A includes the letter "B", which indicates that the content of primary memory block 712A has changed since the time of the last backup. Similarly, backup memory block 713B has different content "D" than the corresponding primary memory block 713A having content "E"; backup memory block 714B has different content "E" than the corresponding primary memory block 714A having content "F"; and backup memory block 715 has different content "F" than the corresponding primary memory block 715A. In short, primary memory block 711A has not changed, whereas primary memory blocks 712A, 713A, 714A and 715A have changed.

The change manager 740 keeps track of all the primary memory blocks that have changed since the time of the last backup. The change manager 740 may accomplish this in any number of ways.

Figure 4B:
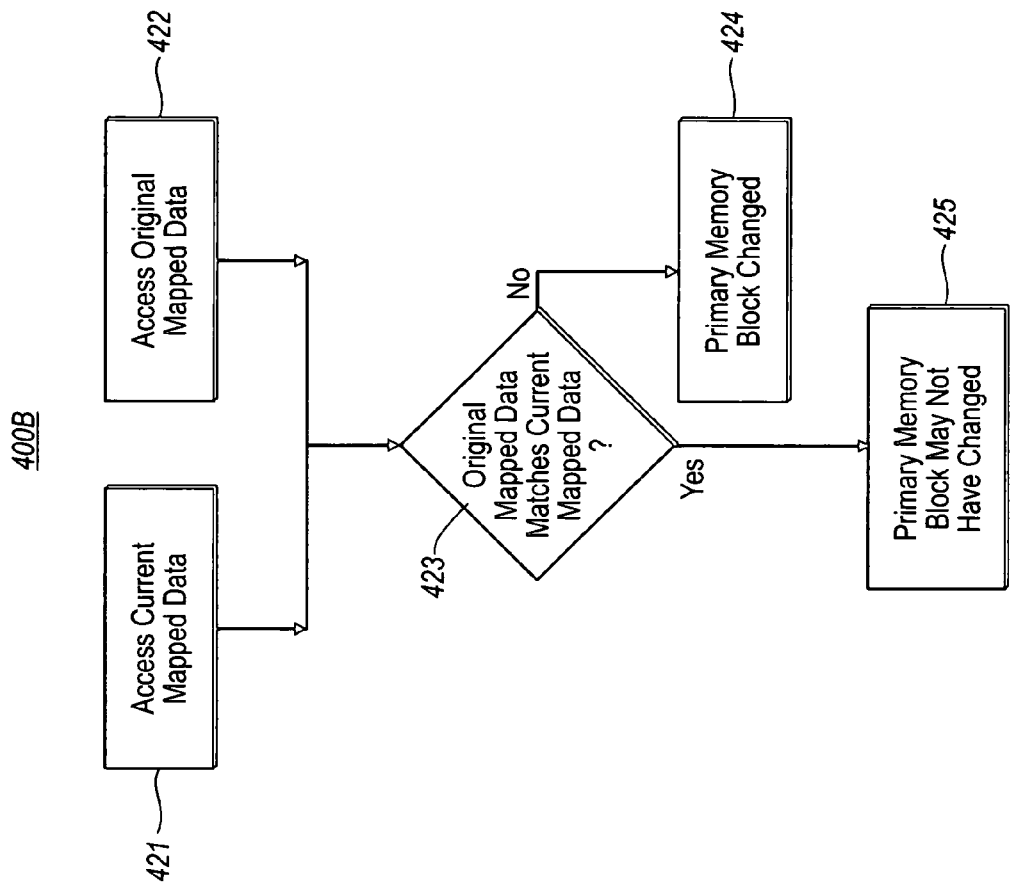
FIG. 4B illustrates a flowchart of another method for identifying altered primary memory blocks suitable for use with the method of FIG. 3.
Figure 4A:
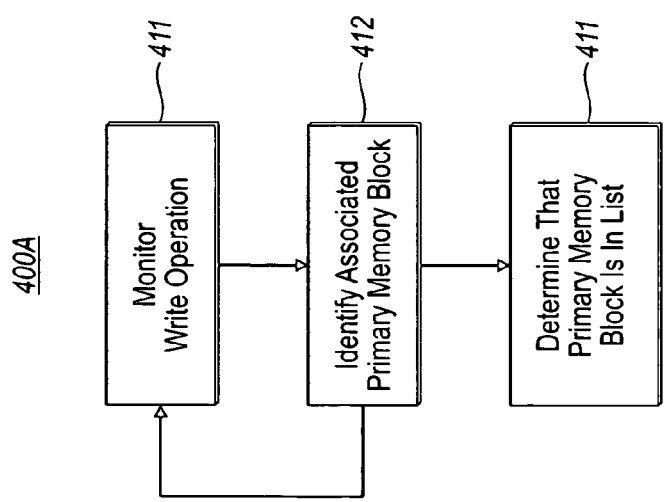
FIG. 4A illustrates a flowchart of a method for identifying altered primary memory blocks suitable for use with the method of FIG. 3.

FIG. 4A illustrates a flowchart of one method 400A for identifying primary memory blocks that have changed since the time of the last backup. In this method 400A, the change manager 740 simply monitors write operations to the primary memory block (act 411). When there is an associated write operation to a primary memory block, the change manager 740 identifies the associated primary memory block in a list (act 412). If the change manager 740 has been continuously performing this task, then a primary memory block may be identified as changed by simply determining that the primary memory block is included on the list (act 413).

FIG. 4B is a flowchart of an alternative method 400B for identifying primary memory blocks that have changed since the time of the last backup. The method 400B includes accessing a result of a deterministic many-to-one mapping function as applied to the current, possibly altered content of the primary memory block (act 421). An example of a many-to-one mapping function is a hash function. These mapped results are represented for each of the primary memory blocks as "current mapped data" 720 in FIG. 7. For instance, current mapped data 721 is a mapped representation "a" of the current content "A" in primary memory block 711A. Similarly, current mapped data 722 is a mapped representation "b" of the current content "B" in primary memory block 712A; current mapped data 723 is a mapped representation "e" of the current content "E" in primary memory block 713A; current mapped data 724 is a mapped representation "f" of the current content "F" in primary memory block 714A; and current mapped data 725 is a mapped representation "d" of the current content "D" in primary memory block 715A.

A deterministic many-to-one mapping function is any function that results in the same output value for multiple input values. An example of such a function is a hash function. Other examples of such mapping functions include truncating the input bits to generate the output bits, sampling the input bits and providing the sampled bits in a certain order as output bits, and so forth. Since hash functions are a common deterministic many-to-one mapping function, the mapped data will also be referred to herein as a hash.

The many-to-one mapping function is characterized in that if two blocks of data result in two different mapped values (e.g., hash values) when the mapping function (e.g., the hash function) is applied to the two blocks, then there is certainty that the two blocks contain different data. On the other hand, if two blocks of data result in the same mapped value when the mapping function is applied to the two blocks, then the two blocks likely contain the same data to within a given certainty. If the hash function is cryptographically secure, then the certainty is quite high, and the probability of a false match is negligible.

Such hash values are typically much smaller in size than the original data provided to the hash function. This smaller size is symbolized by the hash value being represented by lower case letters, while the larger data provided to the hash value is represented by upper case letters. For instance, the content "A" results in corresponding hash value "a", and so forth for other letters.

In addition to accessing the result of the mapping function as applied to the current, potentially altered content of the primary memory block (act 421), the method 400B also includes accessing a result of the deterministic many-to-one mapping function as applied to original content of the primary memory block as the original content existed at the time of the last backup (act 422). These original mapped results are represented for each of the primary memory blocks as "original mapped data" 730 in FIG. 7. The original mapped data 730 may have been generated at the time of the last backup operation.

For instance, original mapped data 731 is a mapped representation "a" of the original content "A" of primary memory block 711A (and the current content "A" of corresponding backup memory block 711B since the primary memory block 711A has not changed). Similarly, original mapped data 732 is a mapped representation "c" of the original content "C" of primary memory block 712A (and the current content "C" of corresponding backup memory block 712B). Original mapped data 733 is a mapped representation "d" of the original content "D" of primary memory block 713A (and the current content "D" of corresponding backup memory block 713B). Original mapped data 734 is a mapped representation "e" of the original content "E" of primary memory block 714A (and the current content "E" of corresponding backup memory block 714B). Finally, the original mapped data 735 is a mapped representation "f" of the original content "F" of primary memory block 715A (and the current content "F" of corresponding backup memory block 715B).

Original mapped data may be obtained from within the primary computing system or from sources external to the primary computing system. For instance, the original mapped data may be obtained from the backup computing system. Accordingly, the original mapped data 730 is illustrated in FIG. 7 as being between the primary and backup computing systems to symbolize this flexibility.

Once the current mapped data for a given primary block is obtained (act 421) and the original mapped data for the given primary block is obtained (act 422), it is determined whether or not the current mapped data matches the original mapped data (decision block 423). If the mapped data does not match (No in decision block 423), then the primary memory block has changed (block 424). If the mapped data does match (Yes in decision lock 423), then the primary memory block most likely has not changed (block 425). If the deterministic many-to-one mapping function is secure enough, this may be enough to estimate that the altered content of the primary memory block is the same as original content of that same primary memory block.

Returning back to FIG. 3, once a primary memory block that has been altered has been identified (act 301), it is then estimated whether or not the altered content of the primary memory block has matching content from a specific backup (decision block 302) in that the content is the same as another primary memory block as that content exists or existed at the time of the specific backup. If the altered primary memory block does not have such matching content (No in decision block 302), then the primary computing system simply sends the altered content of the primary memory block to the backup computing system (act 303).

For instance, referring to FIG. 7, primary memory blocks 712A, 713A, 714A and 715A have had their content changed since the prior backup. The content "B" of primary memory block 712A is not the same as any of the original content of any primary memory block. Accordingly, the primary computing system sends the entire altered contents of the primary memory block 712A to the backup computing system. The backup computing system would, at some point, write the contents "B" of the primary memory block 712A over the contents "C" of the backup computing system. This write operation may be performed at any time, but may also be delayed until the backup computing system detects that the contents "C" of the backup memory block are not to be transferred to another backup memory block. The backup computing system may not actually overwrite "C" if the backup system stores multiple backups at multiple points-in-time. In this case, the backup system may remember that "C" is associated with this location at one point-in-time and "B" at the later point-in-time.

Referring back to FIG. 7, if the altered primary memory block does have matching content (Yes in decision block 302), then the primary computing system backs up the primary memory block by providing to the backup computing system an identification of the matching content, without providing the entirety of the matching content itself (act 304). In response to receiving the identification of the matching content, the backup computing system accesses identification of the matching content from the primary computing system (act 311), and in response, associates the matching content from the specific backup to the appropriate backup memory block corresponding to the altered primary memory block (act 312). This may be done by performing an actual write of the matching content to the appropriate backup memory block, or perhaps virtually by just having some association between the matching content and the appropriate backup memory block.

For instance, referring to FIG. 7, primary memory blocks 712A, 713A, 714A and 715A have had their content changed since the last backup. The content "B" of primary memory block 712A is not the same as any of the original content of any primary memory block. However, the current content "E" of the primary memory block 713A is the same as the original content "E" of the primary memory block 714A, now stored in backup memory block 714B. Accordingly, the primary computing system sends a relocation instruction to the backup computing system to move the contents of backup memory block 714B to backup memory block 713B. Furthermore, the current content "F" of the primary memory block 714A is the same as the original content "F" of the primary memory block 715A, now stored in backup memory block 715B. Accordingly, the primary computing system sends a relocation instruction to the backup computing system to move the contents of backup memory block 715B to backup memory block 714B. Moreover, the current content "D" of the primary memory block 715A is the same as the original content "D" of the primary memory block 713A, now stored in backup memory block 713B. Accordingly, the primary computing system sends a relocation instruction to the backup computing system to move the contents of backup memory block 713B to the backup memory block 715B. The backup computing system may delay the actual writing of the moved data to its new location until it is sure that the data being overwritten is not also to be moved to yet another location, or it may do the relocation virtually by keeping track of how to rearrange the blocks to represent different points-in-time.

As explained above, the principles of the present invention detect when the content of a primary memory block has simply been moved from one location to another without any other changes. This type of movement is quite common. For instance, a defragmentation utility may move numerous memory block contents from one memory block to another so as to improve disk performance. Under conventional incremental update technology, this would result in a large incremental update file. However, using the principles of the present invention, the size of the incremental update may be significantly reduced since none of the relocated memory blocks would have their contents transferred form the primary to the secondary computing systems. Therefore, channel resources are preserved.

Figure 5:
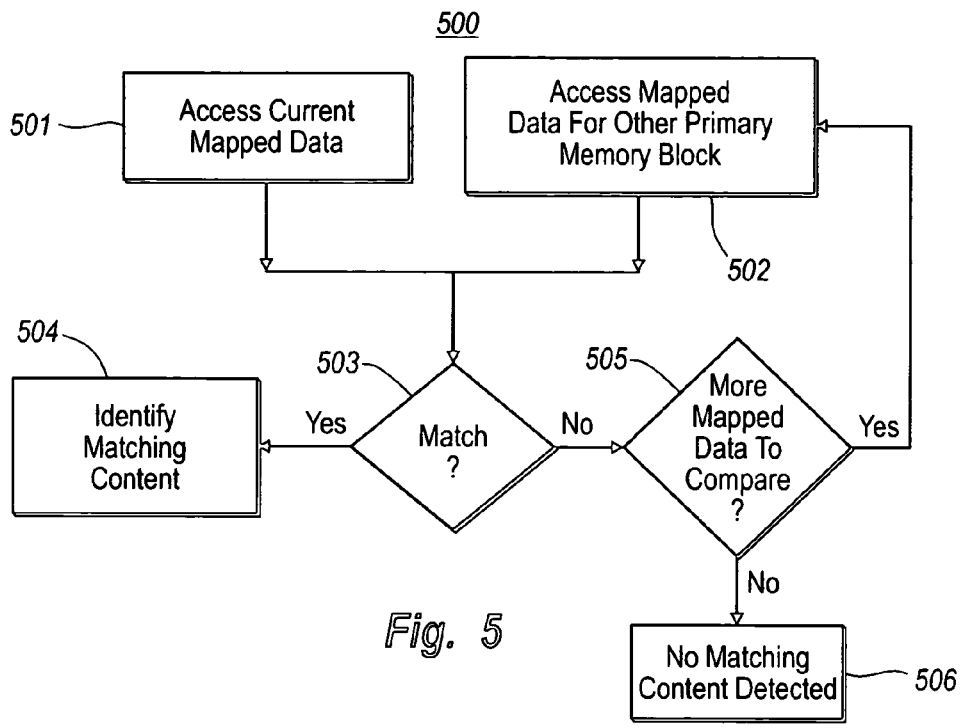
FIG. 5 illustrates a flowchart of a method for determining with high accuracy whether an altered memory block has matching content for a specific backup.
Figure 6:
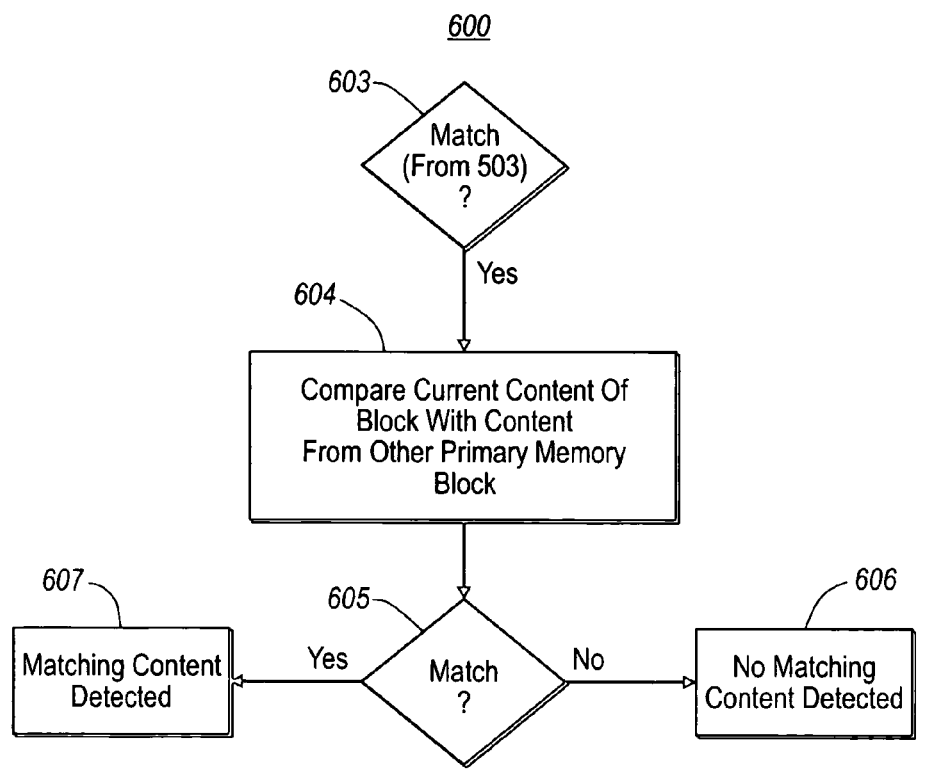
FIG. 6 illustrates a flowchart of a method for determining with certainty whether an altered memory block has matching content for a specific backup.

FIG. 5 illustrates a flowchart of a method 500 for estimating that the altered contents of the primary memory block (also referred to as a "first" primary memory block) are the same as content of another primary memory block (also referred to as a "second" memory block) as the other primary memory block exists in a specific backup. The use of the term "first" and "second" in this description and in the claims is not intended to imply any sort of sequential, positional, or chronological ordering, but is merely used to distinguish one arbitrary memory block from another arbitrary memory block.

Referring to FIG. 5, this estimation may be made by accessing a current result of a deterministic many-to-one mapping function as applied to the altered content of the first primary memory block (act 501), and by accessing a result of the deterministic many-to-one mapping function as applied to the content of other primary memory blocks as those other primary memory blocks existed at the time of a specific backup. For example, referring to FIG. 7, if the primary memory block 713A were being evaluated, a backup logic module 750 may access the current mapped data "e" for the primary memory block. Now suppose the specific backup that is being compared for matching data is the same as the prior backup at which time backup memory blocks 711B through 715B were generated. The backup logic module 750 may then compare the original mapped data for the primary memory blocks against the mapped data for the other memory blocks associated with the prior backup until a match is found (Yes in decision block 503, and Yes in decision block 505) or until there are no more primary memory blocks to check (No in decision block 505).

For instance, if the backup logic module 750 were to evaluate the other primary memory blocks from top to bottom in FIG. 7, the backup logic module 750 would access the original mapped data 731 for the primary memory block 711A (act 502), determine that the original mapped data 731 having content "a" does not match the current mapped data 723 having content "e" (No in decision block 503), and then proceed to do the same for the next primary memory block (Yes in decision block 505). This process would proceed downwards repeating for other original primary data blocks (including possibly testing the original mapped data 733 of the same primary memory block 713A against the current mapped data 723 having content "e"). Finally, when comparing the original mapped data 734 having content "e" for the primary memory block 714A against the current mapped data 723 having content "e" for the primary memory block 713A, a match is found (Yes in decision block 503), and a relocation is thereby detected (act 504). Note that FIG. 5 illustrates symbolically how a match may be detected. In actual implementation, it may be more efficient to use a hash table in which the original mapped datas are placed into a conventional hash table (possibly using the full original mapped data bits or a sub-set of those bits as the hash values). Then any matches can quickly be identified, without comparing current mapped data to all original mapped data.

Note that altered content for a particular primary memory block need not only be compared against potentially matching data from a single prior backup. Instead, the current mapped data for the current primary memory block may be compared against mapped data for other primary memory blocks spanning multiple backup times. For instance, after verifying that the current mapped data for the current primary memory block does not match the mapped data for the immediate prior backup, the current mapped data may be checked against the current mapped data for backups preceding the more immediate prior backup. The current mapped data may even be checked against mapped data for backups that have not yet even been completed, and are still queued at the primary computing system. In that case, the hash values of the hash table may include matching entries that identify matching content, where the identification of the matching content includes an identification of the specific backup, as well as an identification of the particular memory block within that backup.

If the mapping algorithm were a cryptographically secure hash function, then this matching alone may be sufficient to determine with sufficiently high probability that the actual contents of the memory block have been transferred. However, if the hash function was not sufficiently strong, further assurance of the relocation may be attained by following the flowchart of FIG. 6.

Specifically, when original mapped data for a primary memory block is found that matches the current mapped data of the primary memory back (Yes in decision block 603), the altered content of the primary memory block may be compared byte-by-byte with the actual original content from the other primary memory block (act 604). If all of the bytes are the same, (Yes in decision block 605, then a match is found (block 607). If any of the bytes are different, a match is not found (No in decision block 605), and thus other primary memory block content cannot serve as a reference for the current primary memory block (block 606). When a match is not detected at 606, processing would proceed in FIG. 5 at decision block 505.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A method for a primary computing system to backup at least a portion of storage at the primary computing system to a backup computing system, the method comprising:
   an act of identifying a first primary memory block having altered content that has changed since the time of a prior backup to the backup computing system;
   an act of estimating that the altered content of the first primary memory block is the same as content of a second primary memory block as the content existed at the time of a specific backup to the backup computing system; and
   an act of backing up the first primary memory block to the backup computing system by providing to the backup computing system an indication that the altered content of the first primary memory block is the same as the content of the second primary memory block as the second primary memory block exists at the time of the specific backup, without providing again the content of the first primary memory block during the act of backing up.

2. A method in accordance with claim 1, wherein the act of identifying a first primary memory block comprises:
- an act of monitoring write operations to primary memory blocks of the primary computing system;
- an act of identifying which primary blocks have had associated write operations in a list; and
- an act of determining that the first primary memory block is included on the list.

3. A method in accordance with claim 1, wherein the act of estimating that the altered content of the first primary memory block is the same as content of a second primary memory block comprises:
- an act of accessing a first result of a deterministic many-to-one mapping function as applied to the altered content of the first primary memory block;
- an act of accessing a second result of the deterministic many-to-one mapping function as applied to the content of the second primary memory block as the content existed at the time of a specific backup; and
- an act of determining that the first result is the same as the second result.

4. A method in accordance with claim 3, wherein the act of estimating that the altered content of the first primary memory block is the same as content of a second primary memory block further comprises:
- an act of comparing the first primary memory block byte-by-byte with the second primary memory block; and
- an act of verifying that each byte of the first primary memory block is the same as the corresponding byte of the second primary memory block.

5. A method in accordance with claim 1, wherein the act of estimating that the altered content of the first primary memory block is the same as content of a second primary memory block comprises:
- an act of accessing a first result of a deterministic many-to-one mapping function as applied to the altered content of the first primary memory block;
- an act of accessing a second result of the deterministic many-to-one mapping function as applied to the content of the second primary memory block as the content existed at the time of the prior backup;
- an act of determining that the first result is not the same as the second result;
- an act of accessing a third result of a deterministic many-to-one mapping function as applied to the content of the second primary memory block as the content existed at the time of the specific backup, wherein the specific backup is a different backup than the prior backup;
- an act of determining that the first result is the same as the third result.

6. A method in accordance with claim 1, wherein the act of estimating that the altered content of the first primary memory block is the same as content of a second primary memory block comprises:
- an act of accessing a first result of a deterministic many-to-one mapping function as applied to the altered content of the first primary memory block;
- an act of accessing a second result of the deterministic many-to-one mapping function as applied to the content of the second primary memory block as the content existed at the time of the specific backup, wherein the specific backup is a different backup than the last backup; and
- an act of determining that the first result is the same as the second result.

7. A method in accordance with claim 1, wherein the specific backup is the same as the prior backup.

8. A method in accordance with claim 1, wherein the specific backup has not yet been sent to the backup computing system.

9. A method in accordance with claim 1, further comprising:
- an act of identifying a third primary memory block having altered content that has changed since the time of the prior backup to the backup computing system;
- an act of estimating that the altered content of the third primary memory block is not the same as contents of a plurality of other primary memory blocks as the contents existed at the time of the prior backup; and
- an act of backing up the third primary memory block to the backup computing system by providing to the backup computing system the altered content of the third primary memory block.

10. A method in accordance with claim 1, wherein the first primary memory block is one of a sector of storage, or a cluster of sectors of storage.

11. A method for a primary computing system to backup at least a portion of storage at the primary computing system to a backup computing, system the method comprising:
- an act of identifying a first primary memory block having altered content that has changed since the time of a prior backup to the backup computing system:
- an act of estimating that the altered content of the first primary memory block is the same as content of a second primary memory block as the content existed at the time of a specific backup to the backup computing system; and
- an act of backing up the first primary memory block to the backup computing system by providing to the backup computing system an indication that the altered content of the first primary memory block is the same as the content of the second primary memory block as the second primary memory block exists at the time of the specific backup, without providing again the content of the first primary memory block during the act of backing up;
- wherein the act of identifying a first primary memory block comprises:
  - an act of accessing a first result of a deterministic many-to-one mapping function as applied to the altered content of the first primary memory block;
  - an act of accessing a second result of the deterministic many-to-one mapping function as applied to original content of the first primary memory block as the original content existed at the time of the prior backup; and
  - an act of determining that the first result is different than the second result.

12. A method in accordance with claim 11, wherein the act of accessing the second result comprises:
- an act of accessing the second result exclusively from within the primary computing system.

13. A method in accordance with claim 11, wherein the act of accessing the second result comprises:
- an act of accessing the second result from the backup computing system.

14. A computer program product for use in a primary computing system that is communicatively coupled to a backup computing system, the computer-program product comprising one or more computer-readable storage media having thereon computer-executable instructions that, when executed by one or more processors of the primary computing system, cause the primary computing system to perform a method for backing up at least a portion of storage at the primary computing system to a backup computing system, the method comprising:

an act of identifying a first primary memory block having altered content that has changed since the time of a prior backup to the backup computing system;

an act of estimating whether or not the altered content of the first primary memory block is the same as content of a second primary memory block as the content existed at the time of a specific backup to the backup computing system;

if it is estimated that the content of the first primary memory block is the same as the content of the second primary memory block, an act of backing up the first primary memory block to the backup computing system by providing to the backup computing system an indication that the altered content of the first primary memory block is the same as the content of the second primary memory block as the second primary memory block exists at the time of the specific backup, without providing again the content of the primary memory block during the act of backing up; and if it is estimated that the content of the first primary memory block is not the same as the content of the second primary memory block, an act of backing up the first primary memory block to the backup computing system by providing to the backup computing system the altered content of the first primary memory block.

15. A computer program product in accordance with claim 14, wherein the act of estimating that the altered content of the first primary memory block is the same as content of a second primary memory block comprises:

an act of accessing a first result of a deterministic many-to-one mapping function as applied to the altered content of the first primary memory block;

an act of accessing a second result of the deterministic many-to-one mapping function as applied to the content of the second primary memory block as the original content existed at the time of the last backup; and an act of determining that the first result is the same as the second result.

16. A computer program product in accordance with claim 14, wherein the first primary memory block is one of a sector of storage, or a cluster of sectors of storage.

17. A computer program product in accordance with claim 14, wherein the physical media is one of system memory or removable storage.

18. A computer program product for use in a backup computing system that is communicatively coupled to a primary computing system, the computer program product comprising one or more computer-readable storage media having thereon computer-executable instructions that, when executed by one or more processors of the backup computing system, cause the primary computing system to perform a method for backing up at least a portion of storage of the primary computing system, the method comprising:

an act of accessing from the primary computing system an indication that altered content of a first a primary memory block is the same as content of a second primary memory block as the content currently exists at the time of a specific backup; and in response to the act of accessing, an act of writing the content of a second backup memory block corresponding to the second primary memory block and the specific backup to a first backup memory block corresponding to the first backup memory block.

\* \* \* \* \*